(12) United States Patent
Numata

(10) Patent No.: US 12,096,130 B2
(45) Date of Patent: Sep. 17, 2024

(54) IMAGE CAPTURING APPARATUS, INFORMATION PROCESSING APPARATUS, CONTROL METHOD OF INFORMATION PROCESSING APPARATUS, AND STORAGE MEDIUM

(71) Applicant: CANON KABUSHIKI KAISHA, Tokyo (JP)

(72) Inventor: Aihiko Numata, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 35 days.

(21) Appl. No.: 17/965,044

(22) Filed: Oct. 13, 2022

(65) Prior Publication Data

US 2023/0188863 A1 Jun. 15, 2023

(30) Foreign Application Priority Data

Dec. 13, 2021 (JP) ................................ 2021-201800

(51) Int. Cl.
*H04N 23/76* (2023.01)
*H04N 23/53* (2023.01)
*H04N 23/71* (2023.01)

(52) U.S. Cl.
CPC ............. *H04N 23/76* (2023.01); *H04N 23/71* (2023.01); *H04N 23/53* (2023.01)

(58) Field of Classification Search
CPC ........ H04N 23/76; H04N 23/71; H04N 23/53; H04N 23/81; H04N 25/773
See application file for complete search history.

(56) References Cited

U.S. PATENT DOCUMENTS

| | | | |
|---|---|---|---|
| 10,096,091 B2 | 10/2018 | Lee et al. | |
| 10,798,345 B2 | 10/2020 | Numata | |
| 10,887,527 B2 | 1/2021 | Numata | |
| 2017/0140509 A1 | 5/2017 | Lee et al. | |
| 2021/0385404 A1* | 12/2021 | Niwa | H04N 25/59 |

FOREIGN PATENT DOCUMENTS

JP  2017-091518 A  5/2017

* cited by examiner

*Primary Examiner* — Ahmed A Berhan
(74) *Attorney, Agent, or Firm* — Venable LLP

(57) ABSTRACT

An image capturing unit comprises a photoelectric conversion element configured to detect an address event indicating a change in luminance in each pixel address, an integration unit configured to generate a frame image based on an integrated value obtained by integrating an address event for each pixel, and a determination unit configured to determine whether an integrated value has reached a predetermined threshold value. The determination unit is configured to stop integration in the integration unit when it determines that the integrated value has reached a predetermined threshold value.

19 Claims, 9 Drawing Sheets

IMAGE CAPTURING APPARATUS, INFORMATION PROCESSING APPARATUS, CONTROL METHOD OF INFORMATION PROCESSING APPARATUS, AND STORAGE MEDIUM

BACKGROUND OF THE INVENTION

Field of the Invention

The present invention relates to an image capturing apparatus, an information processing apparatus, a control method of an information processing apparatus, and a storage medium.

Description of the Related Art

In order to realize high-speed processing, there has been proposed an asynchronous-type photoelectric conversion element (hereafter referred to as a "Dynamic Vision Sensor (DVS)") that detects a change in luminance as an address event for each pixel address in real time. By using a DVS, it becomes possible to continuously detect a specific subject at a high speed.

Japanese Patent Laid-Open No. 2017-91518 discloses an example of generating a contour frame image from the output of a DVS and by superimposing a plurality of frames to generate an image that is close to a frame image, which is acquired by an image capturing apparatus that uses a synchronous-type solid-state image capturing element. However, there is a problem in that if the cumulative number is small, the image will lack gradation, and if the cumulative number is too large, it will cause overexposure and underexposure.

Accordingly, in an image capturing apparatus that uses an asynchronous-type photoelectric conversion element, it is one object of the present invention to generate a frame image in which deterioration of gradation, overexposure, and underexposure are suppressed.

SUMMARY OF THE INVENTION

An image capturing apparatus of one aspect of the present invention comprises a photoelectric conversion element configured to detect an address event indicating a change in luminance in each pixel address, an integration unit configured to generate a frame image based on an integrated value that integrates the address event for each pixel, and a determination unit configured to determine whether the integrated value has reached a predetermined threshold, wherein the determination unit is configured to stop integration in the integration unit when it has determined that the integrated value has reached the predetermined threshold value.

Further features of the present invention will become apparent from the following description of embodiments with reference to the attached drawings.

DESCRIPTION OF THE EMBODIMENTS

Hereinafter, with reference to the accompanying drawings, favorable modes of the present invention will be described using embodiments. In each diagram, the same reference signs are applied to the same members or elements, and duplicate descriptions will be omitted or simplified.

Figure 1:
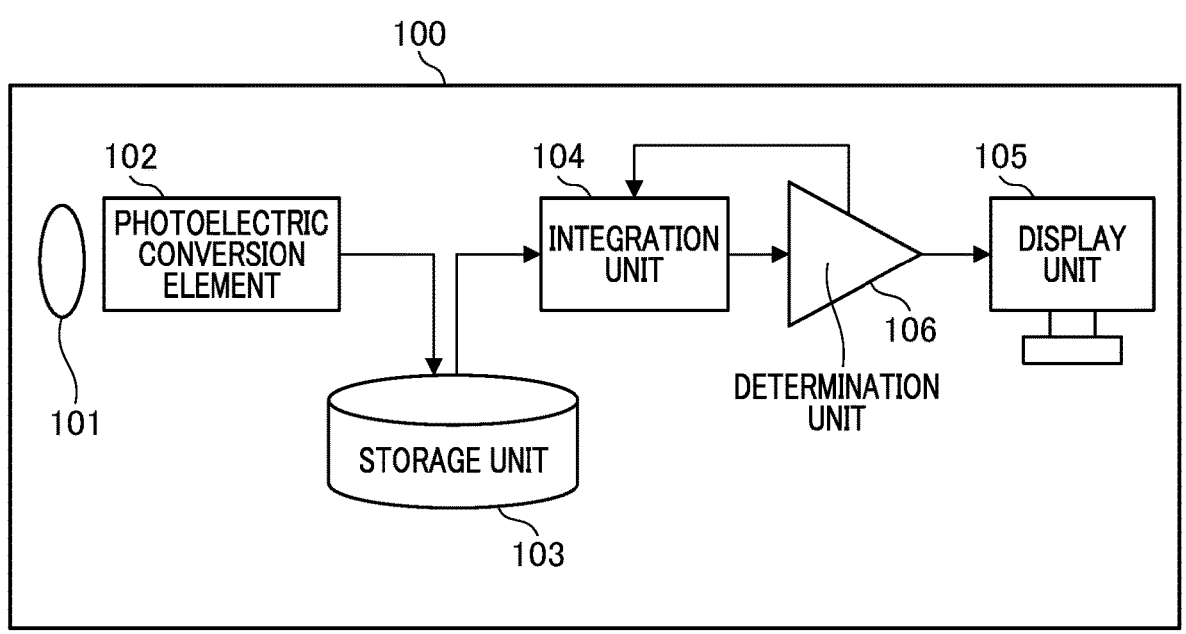
FIG. 1 is a schematic diagram showing a configuration of an image capturing apparatus according to the embodiment of the present invention.

FIG. 1 is a schematic diagram showing a configuration of an image capturing apparatus according to the embodiment of the present invention. In FIG. 1, an image capturing apparatus 100 includes an image forming optical system 101, an asynchronous-type photoelectric conversion element (DVS) 102, a storage unit 103, an integration unit 104, a display unit 105, and a determination unit 106.

Figure 2A:
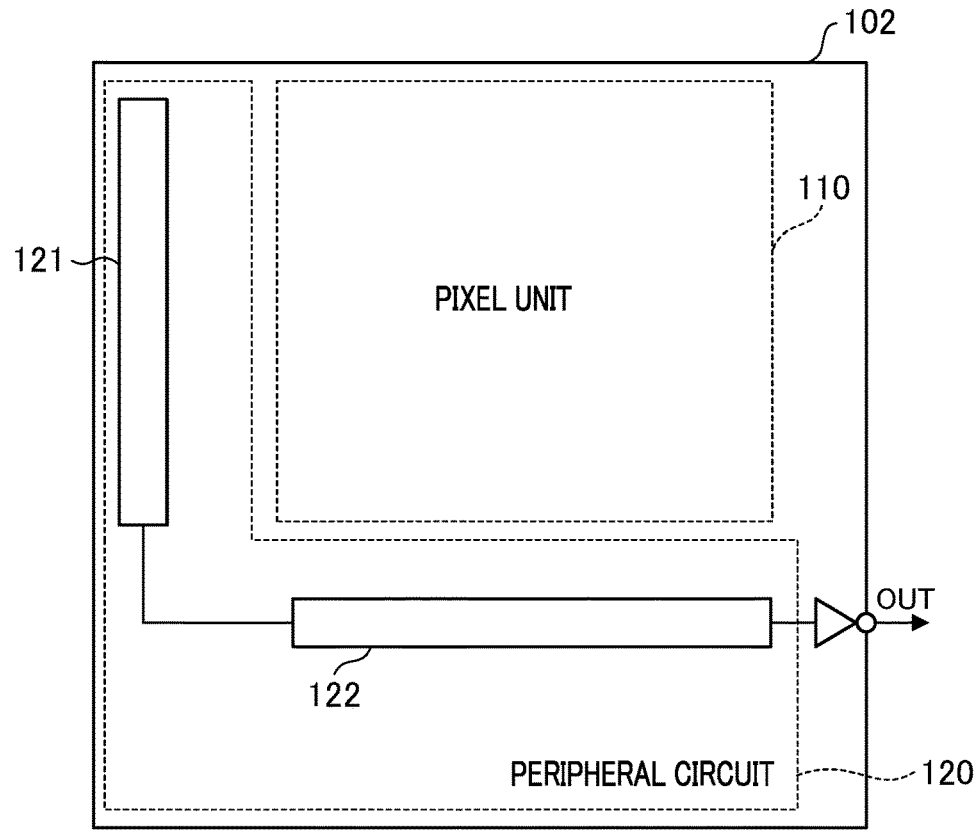
FIGS. 2A and 2B are diagrams showing examples of a configuration of a photoelectric conversion element.

FIG. 2 is a diagram showing an example of a configuration of the photoelectric conversion element 102. The photoelectric conversion element 102 is an asynchronous-type photoelectric conversion element that detects a change in luminance as an address event for each pixel address in real time. The photoelectric conversion element 102 acquires a pixel signal, and outputs the pixel signal to the storage unit 103. FIG. 2A is a diagram showing an example of a configuration of the entire photoelectric conversion element 102. The photoelectric conversion element 102 includes a pixel unit 110 and a peripheral circuit 120.

Figure 2B:
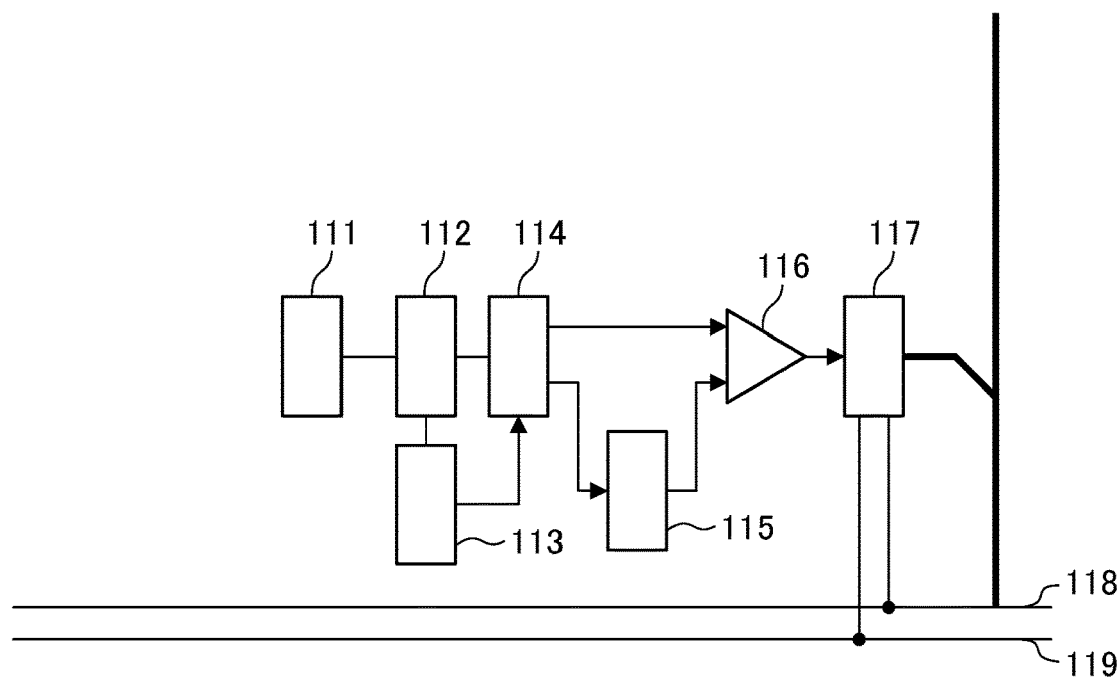

FIG. 2B is a diagram showing an example of a configuration of the pixel unit 110. The pixel unit 110 is configured to include a photoelectric conversion unit 111, a pixel counter 112, a time counter 113, a first determination circuit 114, a memory 115, a comparator 116, a second determination circuit 117, a response circuit 118, and a selection circuit 119. In contrast, the peripheral circuit 120 is configured to include a vertical arbitration circuit 121 and a horizontal output circuit 122.

The photoelectric conversion unit 111 is provided with an avalanche photodiode (Photon Avalanche Diode (PAD)) that operates in Geiger mode. In addition, the photoelectric conversion unit 111 is configured to count the number of photons incident on the photoelectric conversion unit 111 by the pixel counter 112. The time counter 113 counts the time during which photons are incident to the photoelectric conversion unit 111.

When the number of photons counted by the pixel counter 112 reaches a first threshold value, the first determination circuit 114 stops the time count in the time counter 113. In the memory 115, past count values of the time counter 113 are stored. The difference in count values between a present count value of the time counter 113 and a past count value of the time counter 113 is obtained using the comparator 116.

In a case in which the count value of the difference is a second threshold value or greater, the second determination circuit 117 sends a request signal to the vertical arbitration circuit 121 via the response circuit 118. The response circuit 118 receives a response indicating whether to permit output of address event data from the vertical arbitration circuit 121. In a case in which the difference in the count values is less than the second threshold value, a request signal is not sent.

When the response circuit 118 receives a response indicating permission of the output, the selection circuit 119 outputs the count value of the time counter 113 to the horizontal output circuit 122. The horizontal output circuit 122 outputs the received count value as an output signal to the storage unit 103 from the photoelectric conversion element 102.

Because the difference in the count values calculated by the comparator 116 corresponds to the reciprocal of the photon incident frequency, the photoelectric conversion element 102 of the present embodiment has the function of measuring "a change in photon incident frequency", that is, a change in luminance. Further, by using the second determination circuit 117, an address event is output only in a case in which the difference in the interval of the time in which the number of incident photons has reached the first threshold value is greater than or equal to the second threshold value.

In other words, the photoelectric conversion element becomes one in which, in a case in which the difference in incident frequency is large, the incident frequency is output, and in a case in which the difference is small, the incident frequency is not output. The above configuration can realize an asynchronous-type photoelectric conversion element that detects a change in luminance as an address event for each pixel address in real time.

The foregoing shows a case in which a photoelectric conversion element is used that detects a change in photon incident frequency by measuring the time in which photons are incident by using a PAD in a photoelectric conversion unit. However, the configuration in FIG. 2 is given for mere illustrative purposes, and any asynchronous-type photoelectric conversion element that detects changes in luminance as address events in real time may be used. For example, as disclosed in Cited Publication 1, a photoelectric conversion element that detects a change in luminance as a voltage change may be used.

The storage unit 103 is a portion configured to store a pixel signal that has been output from the photoelectric conversion element 102. A pixel signal (address event) that is stored in the storage unit 103 is integrated for each pixel in the integration unit 104. That is, the integration unit 104 generates a frame image based on an address event signal that is an output of the photoelectric conversion element 102. Note that the integration unit 104 may acquire the photoelectric conversion element 102 address event signal directly from the photoelectric conversion element 102.

The display unit 105 is a portion that displays the frame image that has been generated by the integration unit 104. Note that in FIG. 1, although a configuration in which the image capturing apparatus 100 is configured to include the display unit 105 is shown, the image capturing apparatus 100 may include a network connection means, and the image capturing apparatus 100 and a host device such as an information processing apparatus that is connected via a network may be configured to include a display unit. In this case, the image capturing apparatus 100 includes an output unit that outputs a frame image to a host device.

The determination unit 106 is a portion that adjusts the number of integrations of the pixel signals in the integration unit 104. Specifically, the determination unit 106 determines whether the integrated value of the pixel signal that has been integrated for each pixel in the integration unit 104 has reached a predetermined threshold value, and stops the integration in the integration unit 104 in a case in which the integrated value has reached the predetermined threshold value. By adjusting the number of integrations in the integration unit 104, it is possible for the image capturing apparatus 100 of the present embodiment to generate a frame image in which both suppression of deterioration of gradation and suppression of overexposure and underexposure are achieved.

Figure 3:
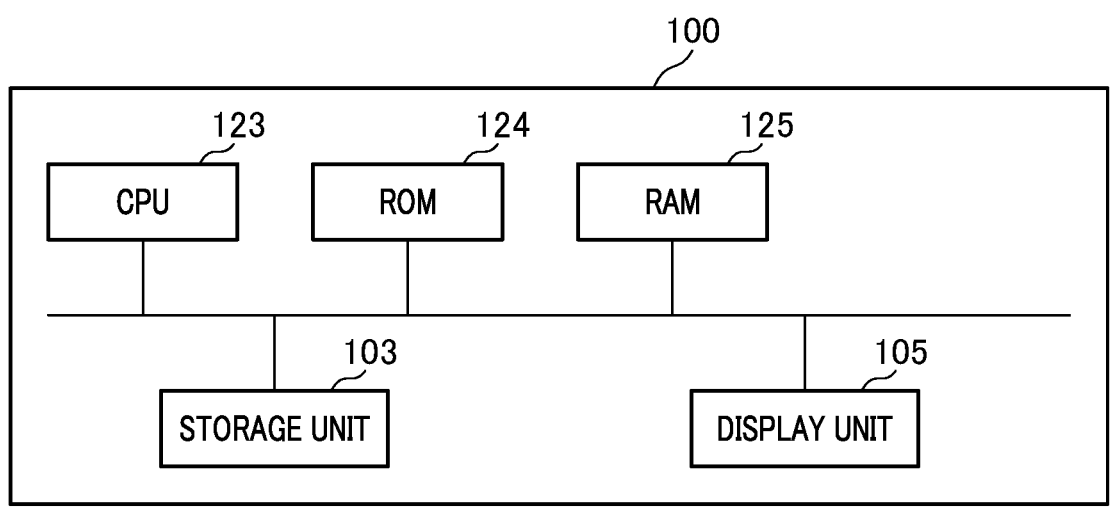
FIG. 3 is a block diagram showing an example of a hardware configuration that executes a function of an image capturing apparatus.

FIG. 3 is a block diagram showing an example of a hardware configuration that executes a function of the image capturing apparatus 100. The image capturing apparatus 100 includes a CPU 123, a ROM 124, a RAM 125, the storage unit 103, and the display unit 105. The CPU 123 reads a program that is stored in the ROM 124 and thereby controls a process of the image capturing apparatus 100.

The RAM 125 is used as a temporary storage region such as a main memory, a work area, or the like of the CPU 123. The ROM 124 stores a boot program and the like. By the CPU 123 executing a process based on a program that is stored in the ROM 124, a function of the image capturing apparatus 100, a process of the image capturing apparatus 100, and the like are realized.

The display unit 105 is a display medium such as a display, and displays the frame images generated by the integration unit 104. As described above, the display unit 105 may be an independent device from the image capturing apparatus 100. In addition, the storage unit 103 may be, for example, a storage medium such as a hard disk, an SD card, or the like.

In this context, a method for generating a frame image in the present embodiment will be explained by comparison with the conventional method. In a case in which an image capturing apparatus uses a conventional synchronous-type solid-state image capturing element, a frame image is generated at a fixed period that is determined by a frame rate of a solid-state image capturing element. Therefore, in an image capturing apparatus that uses a DVS, it is considered that a frame image is generated at a fixed period.

Figure 4A:
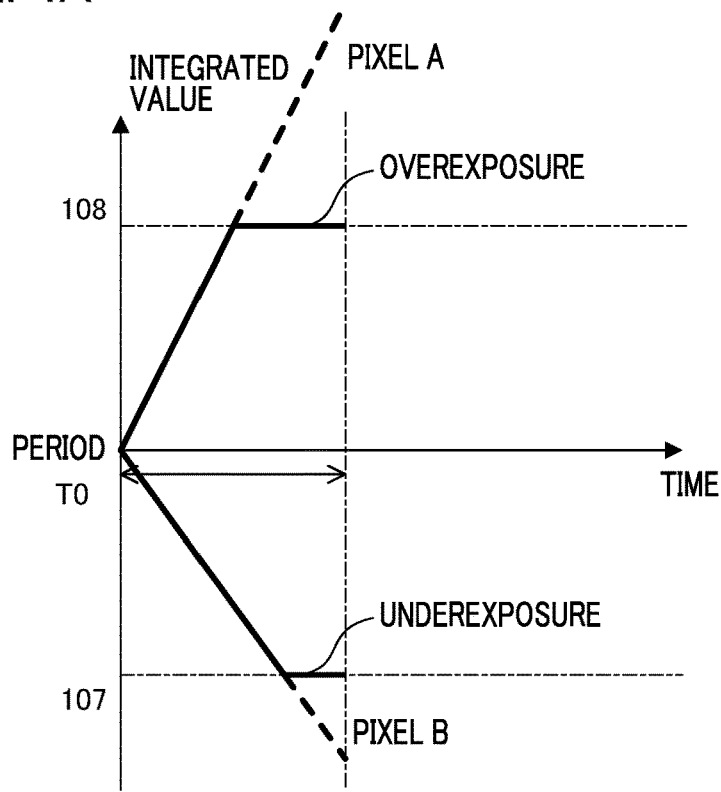
FIGS. 4A and 4B are diagrams for explaining a conventional image generation method.
Figure 4B:
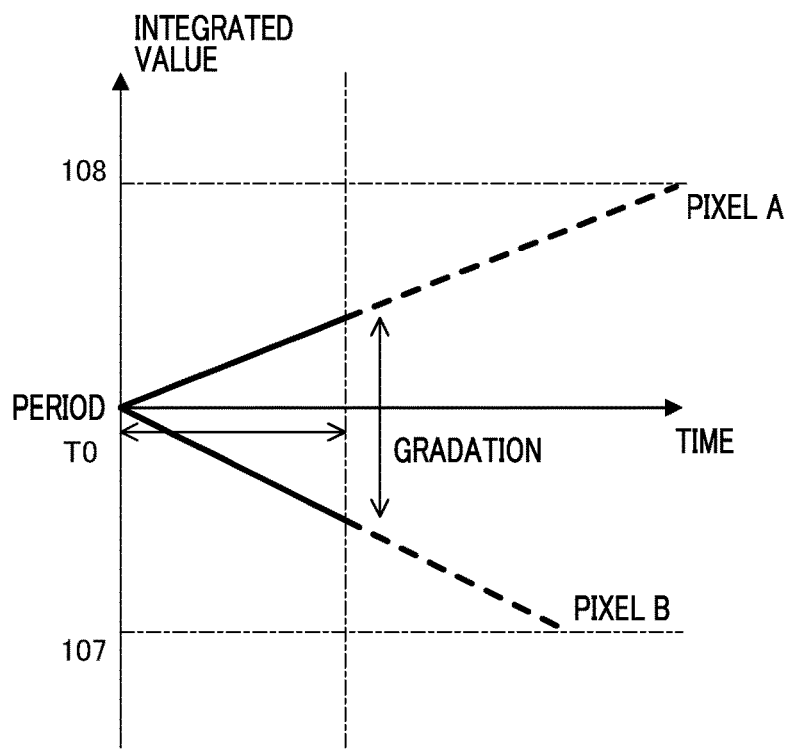

FIG. 4 is a diagram for explaining a conventional image generation method. Specifically, it is a diagram that shows the relationship between the luminance change per unit time and the integrated value in a case in which the pixel signal is integrated at a fixed period T0 in pixel A, in which the luminance changes in the plus direction, and pixel B, in which the luminance changes in the minus direction. FIG. 4A shows a case in which the luminance change per unit time is relatively large, and FIG. 4B shows a case in which the luminance change per unit time is relatively small.

A minimum level 107 and a maximum level 108 shown in FIG. 4 are values that are determined by the number of bits that can be displayed by the display unit 105. For example, in a case in which the display unit 105 has an 8-bit gradation, the minimum level 107 is minus 127 LSB, and the maximum level 108 is plus 127 LSB.

As can be understood in FIG. 4, when a frame image is generated at a fixed period T0, as shown in FIG. 4A, in a case in which the luminance change per unit time is relatively large, overexposure (the integrated value exceeds the maximum level 108) and underexposure (the integrated value is below the minimum level 107) occur. In contrast, in a case in which the luminance change per unit time is relatively small, as shown in FIG. 4B, the gradation becomes poor. As a result, the difference in the integrated value for each pixel is small, and the difference between the integrated values becomes difficult to recognize.

Accordingly, in the image capturing apparatus 100 of present embodiment, instead of generating the frame image at a fixed period, the timing at which the frame image is generated is changed by the integrated value of the integrated pixel signal. Specifically, the number of integrations is maximized within a range in which overexposure and underexposure do not occur.

That is, among the integrated value of each of the pixel signals, the integration is stopped when the largest integrated value reaches the maximum level 108 or when the smallest integrated value reaches the minimum level 107. That is, in this context, the maximum level 108 is the threshold value of the plus direction, and the minimum level 107 is the threshold value of the minus direction.

Figure 5A:
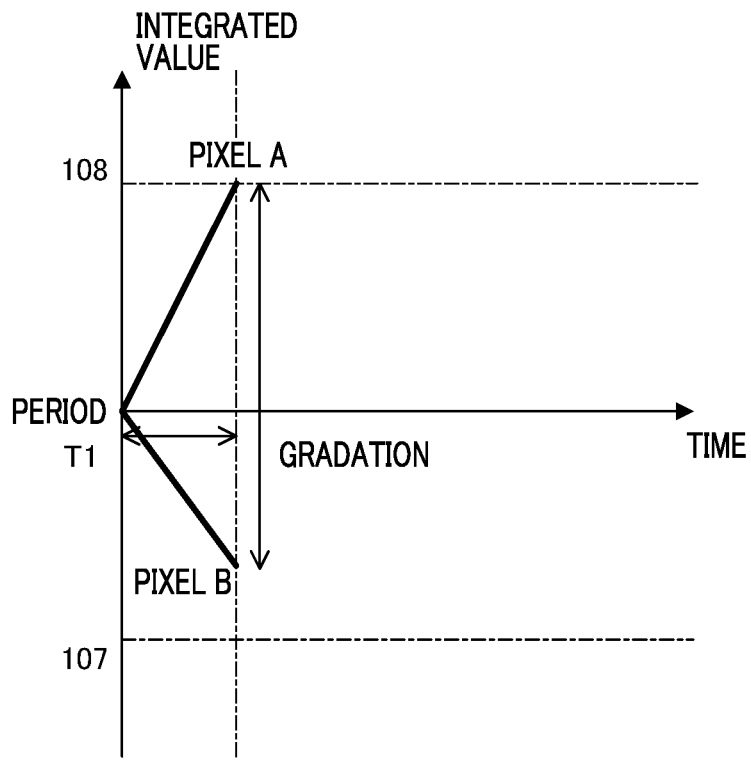
FIGS. 5A and 5B are diagrams explaining an image generation method of the present embodiment.
Figure 5B:
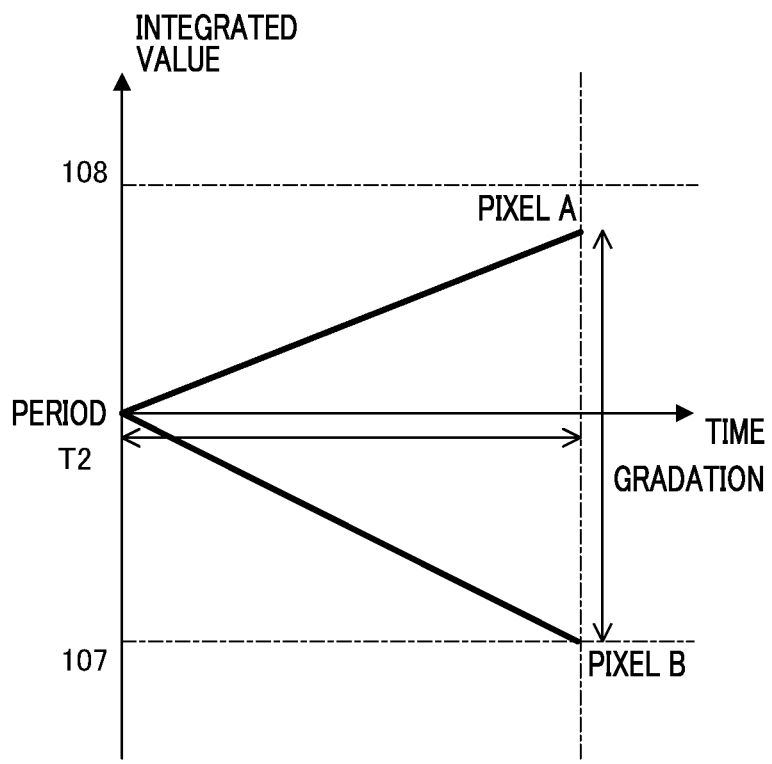

FIG. 5 is a diagram explaining an image generation method of the present embodiment. Specifically, it is a diagram that shows the relationship between the luminance change per unit time and the integrated value in a case in which the luminance change is integrated by the method of present embodiment in pixel A, in which the luminance changes in the plus direction, and pixel B, in which the luminance changes in the minus direction. FIG. 5A shows a case in which the luminance change per unit time is relatively large, and FIG. 5B shows a case in which the luminance change per unit time is relatively small.

As shown in FIG. 5A, in a case in which the luminance change per unit time is relatively large, because the integrated value reaches the minimum level 107 or the maximum level 108 in a time that is shorter than the period T0, the period T1 for generating the frame image is set to be shorter than the period T0 of FIG. 4A. (In FIG. 5A, because the timing when pixel A reaches the maximum level 108 is earlier than the timing when pixel B reaches the minimum level 107, the integration is stopped at the timing when pixel A reaches the maximum level 108.)

Thereby, even in a case in which the luminance change per unit time is large, it is possible to generate a frame image in which overexposure and underexposure is suppressed.

As shown in FIG. 5B, in a case in which the luminance change per unit time is relatively small, because the time for the integrated value to reach the minimum level 107 or the maximum level 108 is longer than the period T0, the period T2 for generating the frame image is made longer than the period T0 of FIG. 4B. (In FIG. 5B, because the timing at which pixel B reaches the minimum level 107 is earlier than the timing at which pixel A reaches the maximum level 108, the integration is stopped at the timing at which pixel B reaches the minimum level 107.)

Thereby, even in a case in which the luminance change per unit time is small, it is possible to generate a frame image in which deterioration of gradation is suppressed.

In this manner, in the present embodiment, by changing the timing at which the frame image is generated according to the integrated value obtained by integrating the pixel signals, it is possible to generate a frame image in which both suppression of deterioration of gradation and suppression of overexposure and underexposure are achieved.

Note that, even in a case in which an image capturing apparatus uses a conventional synchronous-type solid-state image capturing element, there is a case in which there is a so-called long-second exposure mode, in which the exposure time is made longer than the frame rate in a case in which the luminance is very low (=the pixel signal is small). In the long second exposure mode, because the frame rate is changed according to the size of the pixel signal, the control is similar to that of the concept of the present embodiment. However, in the case of a long second exposure mode, it is a so-called feedback-type control, in which the magnitude of the pixel signal of the previous frame is used to determine the exposure time of the next frame.

In contrast, in the case of the image capturing apparatus 100 of the present embodiment, there is a difference on the point that the number of integration times is determined by the integrated value of the pixel signal of the current frame, making it a feed-forward type of control. In the case of a feedback-type control, the control of exposure time is delayed by at least one frame in a case in which the brightness changes abruptly, and overexposure and underexposure cannot be completely suppressed.

In contrast, in a case in which a frame image is generated by a feedforward control as in the present embodiment, it is possible to suppress overexposure and underexposure in all frames.

In FIG. 5, the frame image generation method in the present embodiment has been explained only for a single frame, but a moving image can be generated by continuously generating a series of frame images. Hereinafter, a method for generating a moving image will be explained.

Figure 6:
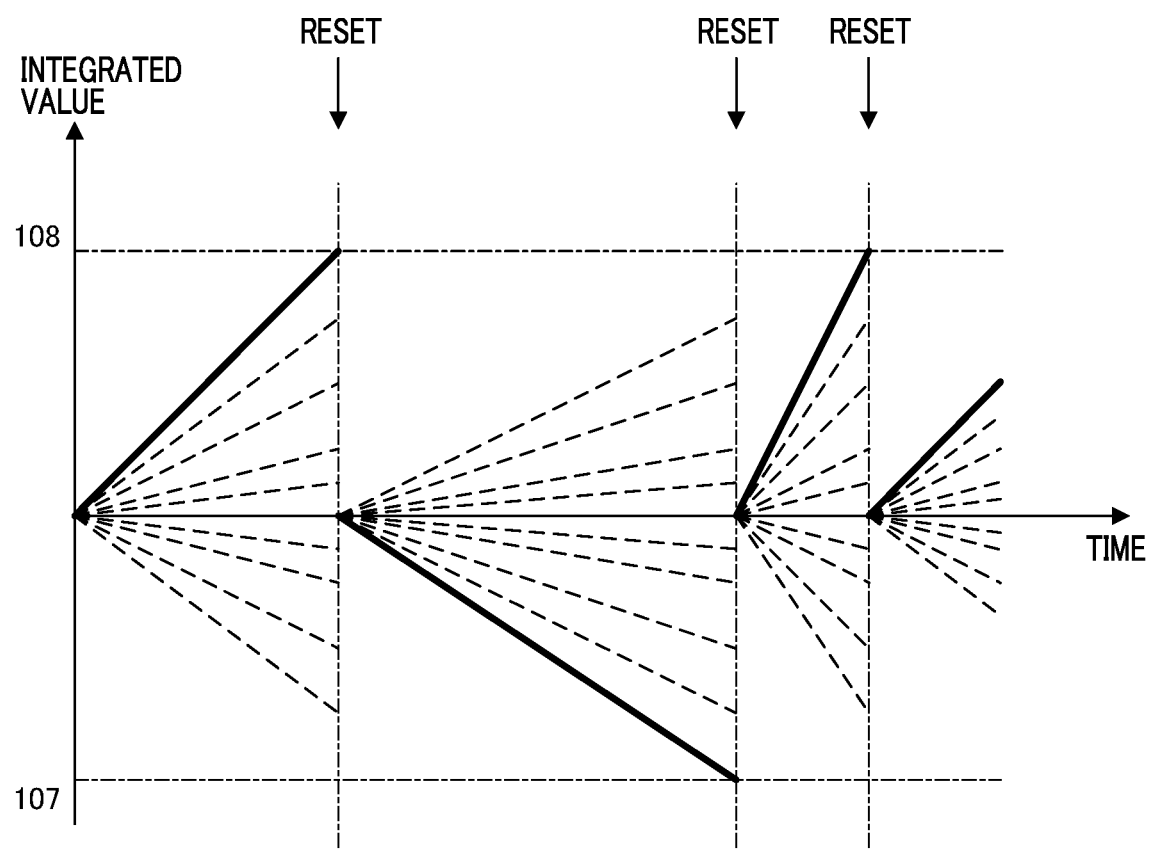
FIG. 6 is a diagram explaining a generation method of a moving image of the present embodiment.

FIG. 6 is a diagram explaining a generation method of a moving image of the present embodiment. Specifically, it is a diagram that explains the method for generating a series of frame images in the present embodiment. In the diagram, the thick solid line indicates the integrated value of a pixel in which the integrated value has reached a predetermined threshold value, and the dashed lines indicate the integrated value of other pixels. In FIG. 6, in a case in which the pixel signal that is integrated for each pixel has reached a predetermined threshold value, in the integration unit 104, the integrated value is reset once and returned to zero, and the integration of the next frame is started.

By generating a moving image in this manner, when the change in brightness per unit time is relatively large, it is possible to increase the frequency of frame updates, and when the change in brightness per unit time is relatively small, it is possible to decrease the frequency of frame updates. Therefore, while accurately recognizing a high-speed phenomenon, it is possible to efficiently recognize a phenomenon with little change in a short period of time.

Figure 7:
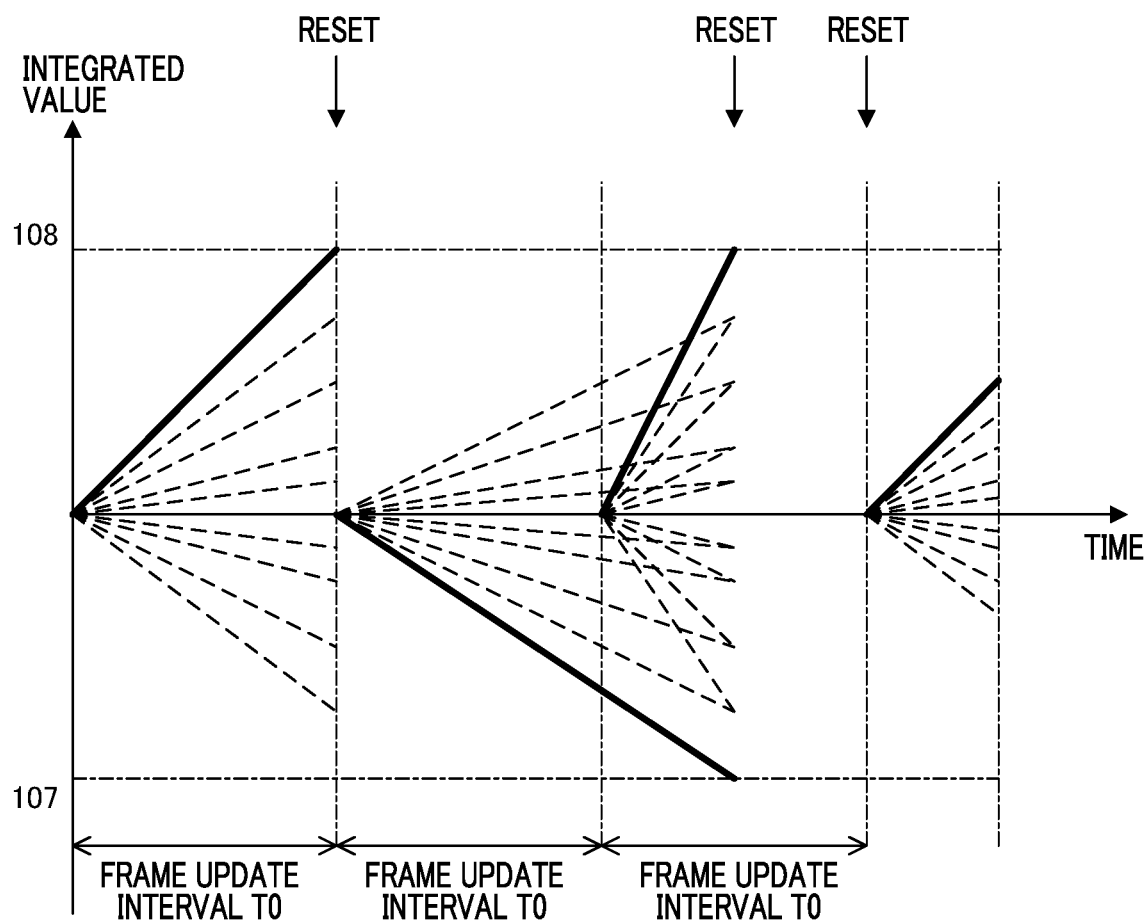
FIG. 7 is a diagram explaining a first modified example of a moving image generation method of the present embodiment.

FIG. 7 is a diagram explaining a first modified example of a moving image generation method of the present embodiment. In the diagram, the thick solid line indicates the integrated value of a pixel in which the integrated value has reached a predetermined threshold value, and the dashed lines indicate the integrated values of other pixels. In FIG. 7, while the frame update interval T0 is made fixed, in a case in which the pixel signal that is integrated for each pixel has reached a predetermined threshold value, the integration is stopped. By generating a moving image in this manner, it is possible to generate a moving image having a fixed frame rate, and it is possible to perform processing similar to that of a moving image captured by an image capturing apparatus by using a conventional synchronous-type solid-state image capturing element.

Note that in the case of the configuration of FIG. 7, it is necessary to start the integration of the next frame before the integration in the integration unit 104 is stopped. Therefore, the integration unit 104 may include a plurality of integration units, and the configuration may be such that an integration unit to be used for each update interval is changed.

Specifically, for example, the configuration may be such that an integration unit to be used at each fixed update interval is switched. In addition, only in a case in which it is necessary to start integration of the next frame before stopping integration in the integration unit 104, a configuration may be used in which other integration units are used sequentially.

In FIGS. 5 to 7, among the integrated value of each pixel, the integration was configured to stop when the integrated value in the plus direction reached the maximum level 108 or when the integrated value in the minus direction reached the minimum level 107. That is, in a case in which the absolute value of the integrated value in either the plus direction or the minus direction has reached a predetermined threshold value, the integration had been configured to stop.

Figure 8:
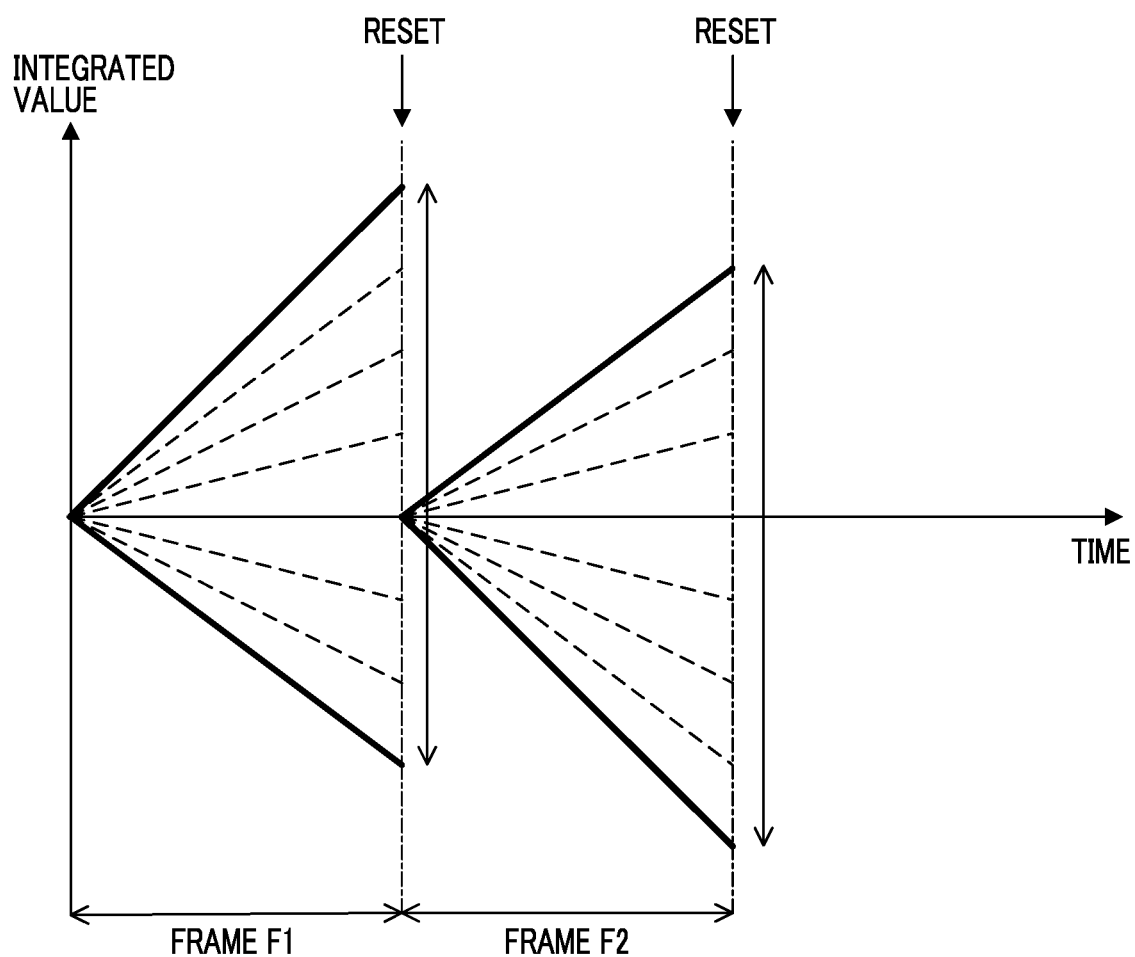
FIG. 8 is a diagram explaining a second modified example of a moving image generation method of the present embodiment.

However, in the modified example shown in FIG. 8, in a case in which the difference between the integrated value in the plus direction and the integrated value in the minus direction has reached a predetermined threshold value, the integration is stopped. FIG. 8 is a diagram explaining a second modified example of a moving image generation method of the present embodiment.

Here, in a case in which the predetermined threshold value is determined by the number of bits included in the display unit 105, and in which the display unit 105 has an 8-bit gradation, the predetermined threshold value is made 255 LSB. By such a configuration, because it is possible for the gradation included by the display unit 105 to be used up effectively, it is possible and preferable to further suppress a decrease in the gradation.

In contrast, in a case in which the integration is configured to stop by the difference between the largest integrated value and the smallest integrated value, the gradation range expressed in the display unit 105 is different depending on the frame. For example, frame F1 of FIG. 8 has a wider gradation range that is assigned to a luminance change in the plus direction and a narrower gradation range that is assigned to a luminance change in the minus direction than frame F2 of FIG. 8.

Accordingly, in a case in which it is desired to keep the gradation range consistent between frames, as shown in FIGS. 5 to 7, making a configuration in which the integration is stopped in a case in which either the largest integrated value reaches the maximum level, or the smallest integrated value reaches the minimum level is preferable.

In the above description, among each of the pixel signals, the largest integrated value and the smallest integrated value were compared with a predetermined threshold value. However, in the case of making such a configuration, because it becomes a configuration in which the occurrence of overexposure and underexposure are prevented even with respect to a defective pixel, there is a case in which the gradation of a frame image generated by the integrated value of a pixel signal other than the defective pixel may become poor. Accordingly, instead of the largest integrated value or the smallest integrated value, the values obtained based on a plurality of pixels may be compared with a predetermined threshold value.

For example, among the pixel signals of all the pixels, the integrated values of the upper 1%, as counted from the largest integrated value, and the integrated values of the lower 1%, as counted from the smallest integrated value, may be compared with a predetermined threshold value. 1% is an example, and among values ranging from 0.01% to approximately 10%, an appropriate value may be used, taking into consideration the occurrence ratio of defective pixels. Thus, by using values obtained based on a plurality of pixels, the influence of a defect pixel can be excluded, and it is possible to suppress the deterioration of the gradation of a frame image generated by an integrated value of pixel signals other than the defective pixel.

Further, instead of using the integrated value of all the pixels of the photoelectric conversion element 102, a predetermined region of interest may be specified, and only the integrated value of pixels within the region of interest may be compared with a predetermined threshold value. That is, a configuration may be made to stop integration only in a case in which the integrated value of the pixels in the region of interest reaches a predetermined threshold value. Specifically, in the determination unit 106, a configuration is made in which the integrated values of pixels other than those in the region of interest are not compared with the predetermined threshold value, and only the integrated value of pixels in the region of interest is compared with the predetermined threshold value.

By making such a configuration, it is possible to suppress overexposure and underexposure of the region of interest while further suppressing the deterioration of the gradation of the region of interest. In a case in which only pixel signals of a region of interest are used, it is preferable that a user interface be provided for the user to specify the region of interest.

In a case in which the pixel signal that is integrated for each pixel does not reach the predetermined threshold value even after the lapse of the threshold value time after the start of integration of pixel signals in the integration unit 104, the integration is stopped at that point, and a frame image may be generated. That is, the image capturing apparatus 100 includes a time counter for measuring the integration time.

In addition, in the determination unit 106, a configuration is made to stop the integration in a case in which the pixel signal that is integrated for each pixel has reached a predetermined threshold value, or a threshold value time has elapsed after the integration of the pixel signal has started in the integration unit 104. By making such a configuration, even in a case in which a detected luminance change is very small, it is possible to generate a frame image at a fixed update interval.

Note that, in a case in which the integration is stopped before the pixel signal that is integrated for each pixel reaches a predetermined threshold value, the frame image becomes a frame image with poor gradation. Accordingly, a display may be made after applying a gain to the value of the luminance change so as to use up the number of bits of the display unit 105. In this case, the image capturing apparatus 100 may include, for example, a gain control unit for controlling the gain of the frame image.

For example, it is assumed that the display unit 105 is 8-bit gradation, and that the largest integrated value is plus 63 LSB, and the smallest integrated value is minus 47 LSB. In this case, by applying twice the gain, the largest integrated value may be displayed as plus 94 LSB, and the smallest integrated value may be displayed as minus 94 LSB.

The threshold value time may be determined automatically by the image capturing apparatus 100, or may be determined by the user. For example, in a case in which the user wants to also capture an image with a small luminance change, the threshold value time is made shorter, and in a case in which only a large luminance change is desired to be confirmed in a short time, the threshold value time is made longer.

In the above explanations, although the predetermined threshold value was determined by the number of bits of the display unit 105, another method may be used to determine the threshold value. For example, in a case in which it is desired to not only display, but also store and use the generated frame image, it is preferable to determine the threshold value by the format type (number of bits) of the image to be stored. In addition, the user may determine a predetermined threshold value, taking into consideration the gamma characteristics of the display unit 105 and the like. At this time, the threshold value corresponding to the luminance change that changes to the plus side (108 in FIG. 5) and the threshold value corresponding to the luminance change that changes to the minus side (107 in FIG. 5) may be set separately.

The modified examples explained above may be used in any combination as appropriate, or may be used by changing each frame.

Figure 9:
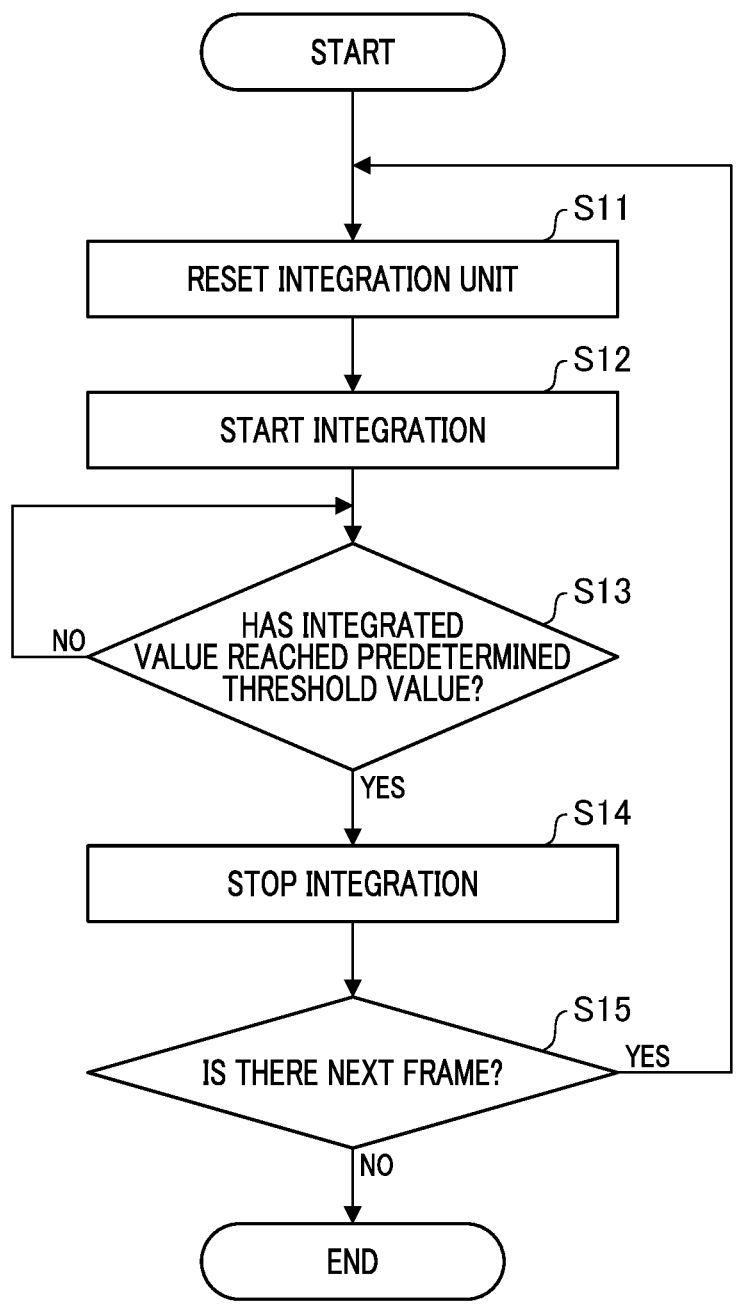
FIG. 9 is a flowchart explaining an image generation method of the image capturing apparatus 100 of the present embodiment.

FIG. 9 is a flowchart explaining an image generation method of the image capturing apparatus 100 of the present embodiment. Each operation (step) shown in this figure may be executed by executing a computer program stored in a memory or the like by the CPU 123, and controlling each unit.

In step S11, the integration unit 104 is reset, and the integrated value of each pixel is set to zero. In step S12, the integration unit 104 reads each pixel signal from the storage unit 103 and starts integration.

In step S13, the determination unit 106 determines whether the integrated value of each pixel has reached a predetermined threshold value. As a result of this determination, in a case in which the integrated value has not reached the predetermined threshold value ("No"), the integration is continued. In contrast, in a case in which the integrated value has reached the predetermined threshold value, the integration is stopped, and the frame image generated by the integrated value of each pixel is displayed on the display unit 105 (step S14). Then, in step S15, it is determined whether there is a next frame, and in a case in which there is a next frame ("Yes"), the processing returns to step s11, and the integration unit 104 is reset to start integration again. In contrast, in a case in which there is no next frame ("No"), the image generation is terminated.

Other Embodiments

While the present invention has been explained with reference to exemplary embodiments, it is to be understood that the invention is not limited to the disclosed exemplary embodiments, and various changes and modifications are possible within the gist of the scope.

For example, the above image generation method may be realized by using an information processing device configured to include a storage unit 103, an integration unit 104, and a determination unit 106. In this case, for example, it is possible to incorporate an information processing apparatus into an image capturing apparatus that includes the image forming optical system 101 and the asynchronous-type photoelectric conversion element 102, or to connect the image capturing apparatus and the information processing apparatus via a network.

The hardware configuration of the information processing apparatus may be similar to the configuration of FIG. 3. The information processing apparatus may include an output unit that outputs a generated frame image or a storage unit that stores the generated frame image.

The scope of the following claims is to be accorded the broadest interpretation to encompass all such modifications and equivalent structures and functions. In addition, as a part or the whole of the control according to the embodiments, a computer program realizing the function of the embodiments described above may be supplied to the image capturing apparatus through a network or various storage media. Then, a computer (or a CPU, an MPU, or the like) of the image capturing apparatus may be configured to read and execute the program. In such a case, the program and the storage medium storing the program configure the present invention.

This application claims the benefit of Japanese Patent Application No. 2021-201800 filed on Dec. 13, 2021, which is hereby incorporated by reference herein in its entirety.

What is claimed is:

1. An image capturing apparatus comprising:
    at least one processor or circuit configured to function as a plurality of units comprising:
    (1) a photoelectric conversion element configured to detect an address event indicating a change in luminance in each pixel address,
    (2) an integration unit configured to generate a frame image based on an integrated value obtained by integrating the address event for each pixel, and
    (3) a determination unit configured to determine whether the integrated value has reached a predetermined threshold,
    wherein the determination unit is configured to stop integration in the integration unit when it determines that the integrated value has reached the predetermined threshold value, and
    wherein in a case in which it is determined that the address event integrated for each pixel has reached the predetermined threshold value, the integration unit is configured to reset the integrated value to zero, and restart the integration of the next frame.

2. The image capturing apparatus according to claim 1, wherein the at least one processor or circuit is further configured to function as a plurality of the integration units, and
    wherein the integration unit to be used is changed in each predetermined update interval.

3. The image capturing apparatus according to claim 1, wherein, when the determination unit determines that either the absolute value of the integrated value of the plus direction or the absolute value of the integrated value of the minus direction among the integrated value of each pixel has reached the predetermined threshold value, integration in the integration unit is stopped.

4. The image capturing apparatus according to claim 1, wherein, when the determination unit determines that the difference between the integrated value of the plus direction and the integrated value of the minus direction among the integrated value of each pixel has reached the predetermined threshold value, integration in the integration unit is stopped.

5. The image capturing apparatus according to claim 3, wherein the determination unit is configured to determine at least one of the integrated values of the plus direction and the integrated values of the minus direction based on a plurality of pixels.

6. The image capturing apparatus according to claim 5, wherein the determination unit is configured to obtain both the integrated value of the plus direction and the integrated value of the minus direction based on the plurality of pixels.

7. The image capturing apparatus according to claim 1, wherein the determination unit is configured to compare the integrated value of pixels of a region of interest among the address events with the predetermined threshold value to determine whether the integrated value has reached the predetermined threshold value.

8. The image capturing apparatus according to claim 1, further comprising a time counter,
wherein the determination unit stops the integration in the integration unit in a case in which either the integrated value has reached the predetermined threshold value, or a threshold time has elapsed since the start of integration of the address event in the integration unit.

9. The image capturing apparatus according to claim 8, wherein, by the lapse of the threshold time after a start of integration of an address event in the integration unit, the frame image that has been generated by stopping the integration in the integration unit is output with a predetermined gain.

10. The image capturing apparatus according to claim 1, wherein the predetermined threshold value is determined corresponding to a number of bits of a display device that displays the frame image.

11. The image capturing apparatus according to claim 1, wherein the predetermined threshold value differs for the integrated value of the plus direction and the integrated value of the minus direction.

12. The image capturing apparatus according to claim 1, further including a display device that displays the frame image generated by the integration unit.

13. An information processing apparatus comprising:
at least one processor or circuit configured to function as a plurality of units comprising:
(1) a storage unit configured to store an address event that indicates a change in luminance for each pixel address;
(2) an integration unit configured to generate a frame image based on the integrated value of the address event for each pixel that is stored in the storage unit, and
(3) a determination unit configured to determine whether the integrated value has reached a predetermined threshold value,
wherein the determination unit is configured to stop integration in the integration unit when it determines that the integrated value has reached the predetermined threshold value, and
wherein in a case in which it is determined that the address event integrated for each pixel has reached the predetermined threshold value, the integration unit is configured to reset the integrated value to zero, and restart the integration of the next frame.

14. The information processing apparatus according to claim 13, wherein the at least one processor or circuit is further configured to function as a storage unit configured to store the frame image.

15. An information processing apparatus comprising:
at least one processor or circuit configured to function as a plurality of units comprising:
(1) a storage unit configured to store an address event that indicates a change in luminance for each pixel address;
(2) an integration unit configured to generate a frame image based on the integrated value of the address event for each pixel that is stored in the storage unit, and
(3) a determination unit configured to determine whether the integrated value has reached a predetermined threshold value,
wherein the determination unit is configured to stop integration in the integration unit when it determines that the integrated value has reached the predetermined threshold value, and
wherein the predetermined threshold value is determined corresponding to the format of an image to be stored.

16. A control method of an information processing apparatus, the control method comprising:
storing an address event that indicates a change in luminance for each pixel address;
generating a frame image from the integrated value of the stored address event for each pixel;
determining whether the integrated value has reached a predetermined threshold value; and
stopping the integration when the predetermined threshold value is determined to have been reached,
wherein in a case in which it is determined that the address event integrated for each pixel has reached the predetermined threshold value, the integrated value is reset to zero, and the integration of the next frame is restarted.

17. A non-transitory computer-readable storage medium configured to store a computer program to control an information processing apparatus, wherein the computer program comprises instructions for executing the following processes:
storing an address event that indicates a change in luminance for each pixel address;
generating a frame image from the integrated value of the stored address event for each pixel;
determining whether a value based on the integrated value has reached a predetermined threshold value; and
stopping the integration when the predetermined threshold value is determined to have been reached,
wherein in a case in which it is determined that the address event integrated for each pixel has reached the predetermined threshold value, the integrated value is reset to zero, and the integration of the next frame is restarted.

18. A control method of an information processing apparatus, the control method comprising:
storing an address event that indicates a change in luminance for each pixel address;
generating a frame image from the integrated value of the stored address event for each pixel;
determining whether the integrated value has reached a predetermined threshold value; and
stopping the integration when the predetermined threshold value is determined to have been reached,
wherein the predetermined threshold value is determined corresponding to the format of an image to be stored.

19. A non-transitory computer-readable storage medium configured to store a computer program to control an information processing apparatus, wherein the computer program comprises instructions for executing the following processes:
storing an address event that indicates a change in luminance for each pixel address;
generating a frame image from the integrated value of the stored address event for each pixel;
determining whether a value based on the integrated value has reached a predetermined threshold value; and
stopping the integration when the predetermined threshold value is determined to have been reached, wherein the predetermined threshold value is determined corresponding to the format of an image to be stored.

\* \* \* \* \*